(12) United States Patent
Albizuri

(10) Patent No.: US 9,341,378 B2
(45) Date of Patent: *May 17, 2016

(54) MULTI-GAS APPLIANCE

(71) Applicant: COPRECITEC, S.L., Aretxabaleta (Guipuzcoa) (ES)

(72) Inventor: Iñigo Albizuri, Muxika (ES)

(73) Assignee: Coprecitec, S.L., Aretxabaleta (ES)

( * ) Notice: Subject to any disclaimer, the term of this patent is extended or adjusted under 35 U.S.C. 154(b) by 442 days.

This patent is subject to a terminal disclaimer.

(21) Appl. No.: 14/085,513

(22) Filed: Nov. 20, 2013

(65) Prior Publication Data

US 2014/0080078 A1    Mar. 20, 2014

Related U.S. Application Data

(63) Continuation of application No. 13/857,133, filed on Apr. 4, 2013, which is a continuation of application (Continued)

(30) Foreign Application Priority Data

Feb. 10, 2005 (ES) ............... 200500309 U

(51) Int. Cl.
*F24C 1/02* (2006.01)
*F23C 1/08* (2006.01)
(Continued)

(52) U.S. Cl.
CPC ............. *F24C 1/02* (2013.01); *F16K 5/0214* (2013.01); *F16K 5/08* (2013.01); *F23C 1/08* (2013.01);
(Continued)

(58) Field of Classification Search
CPC ........... F24C 1/02; F24C 1/08; F23D 17/002; F23D 2204/10; F23K 5/007; F23K 2900/05001; F16K 5/08; F16K 5/103; F16K 5/10; F23N 1/007; F23N 2035/16; G01K 15/002; Y10T 137/5109; Y10T 137/5196
USPC ...................... 431/12, 62, 2, 18, 61, 354, 181; 126/39 E, 39 R, 39 N, 25 R, 52; 137/269, 137/270; 251/91, 205–209, 288
IPC ........ F24C 1/02,1/08; F23N 1/00; F23D 17/00; F16K 5/10
See application file for complete search history.

(56) References Cited

U.S. PATENT DOCUMENTS 596,871 A    1/1898    Grist
787,914 A    4/1905    Gibson
(Continued)

FOREIGN PATENT DOCUMENTS

CN    201121736       9/2008
CN    201121736 Y     9/2008
(Continued)

OTHER PUBLICATIONS

International Preliminary Report on Patentability Application No. PCT/EP2006/001143 issued by The International Bureau of WIPO, Geneva, Switzerland, dated Aug. 14, 2007.
(Continued)

*Primary Examiner* — Gregory Huson
*Assistant Examiner* — Daniel E Namay

(57) ABSTRACT

Cooking appliance having an external control panel equipped with one or more regulating valves, where the rotary regulator organ is equipped with various peripheral openings for supplying a flow Q. For the supply of one or another type of gas, NG or LPG, either the control knob or a bezel disk in the external panel are interchangeable on the appliance, being chosen between two different available units, one and the other permitting two different angular position limits A2, A3 of the regulator organ or the supply of a constant flow Qmin through one or another opening with calibrated sections, respectively for NG or LP gas. An appendix in the control knob guided in a slide groove on the control panel of the appliance, or a tongue on the bezel disk stopping the rotation of the control knob, determines the travel limit A2 for the supply of Qmin of NG.

4 Claims, 5 Drawing Sheets

Related U.S. Application Data

No. 13/310,378, filed on Dec. 2, 2011, now Pat. No. 8,449,289, which is a continuation of application No. 12/639,802, filed on Dec. 16, 2009, now Pat. No. 8,092,212, which is a continuation of application No. 11/886,798, filed as application No. PCT/EP2006/001143 on Feb. 9, 2006, now Pat. No. 7,651,330.

(51) Int. Cl.

| | | |
|---|---|---|
| *F23N 1/00* | (2006.01) | |
| *F23D 17/00* | (2006.01) | |
| *F16K 5/02* | (2006.01) | |
| *F23K 5/00* | (2006.01) | |
| *F24C 3/12* | (2006.01) | |
| *G01F 15/00* | (2006.01) | |
| *F16K 5/08* | (2006.01) | |
| *F23D 14/46* | (2006.01) | |
| *F16K 5/10* | (2006.01) | |

(52) U.S. Cl.
CPC .............. *F23D 14/46* (2013.01); *F23D 17/002* (2013.01); *F23K 5/007* (2013.01); *F23N 1/007* (2013.01); *F24C 3/12* (2013.01); *F24C 3/124* (2013.01); *G01F 15/001* (2013.01); *G01F 15/002* (2013.01); *F16K 5/10* (2013.01); *F16K 5/103* (2013.01); *F23D 2204/10* (2013.01); *F23K 2900/05001* (2013.01); *F23N 2035/16* (2013.01); *F23N 2035/24* (2013.01); *Y10T 16/506* (2015.01); *Y10T 137/0318* (2015.04); *Y10T 137/5109* (2015.04); *Y10T 137/5196* (2015.04); *Y10T 137/86823* (2015.04); *Y10T 137/87137* (2015.04); *Y10T 137/87386* (2015.04)

(56) References Cited

U.S. PATENT DOCUMENTS

| | | |
|---|---|---|
| 791,260 A | 5/1905 | Fuller |
| 993,714 A | 5/1911 | Popp |
| 1,215,653 A | 2/1917 | Hale |
| 1,296,406 A | 3/1919 | Kyriakos |
| 1,421,591 A | 7/1922 | Shuler |
| 1,526,500 A | 2/1925 | Kasch |
| 1,590,882 A | 6/1926 | Brown et al. |
| 1,711,436 A | 4/1929 | Williams |
| 1,829,365 A | 10/1931 | Meyer |
| 1,869,764 A | 8/1932 | Methudy |
| 1,921,762 A | 8/1933 | Leins |
| 1,940,171 A | 12/1933 | Huss |
| 2,101,356 A | 12/1937 | Zak |
| 2,512,404 A | 6/1950 | Williams |
| 2,540,056 A | 1/1951 | Robinson |
| 2,626,160 A | 1/1953 | Brumbaugh |
| 2,650,610 A | 9/1953 | Brumbaugh |
| 2,650,612 A | 9/1953 | Brumbaugh |
| 2,650,613 A | 9/1953 | Brumbaugh |
| 2,661,732 A | 12/1953 | O'Keefe |
| 2,723,102 A | 11/1955 | Mueller |
| 2,893,426 A | 7/1959 | Brumbaugh |
| 2,987,078 A | 6/1961 | Du Perow |
| 3,001,547 A | 9/1961 | Brumbaugh |
| 3,068,902 A | 12/1962 | Brumbaugh |
| 3,093,155 A | 6/1963 | Dawes |
| 3,107,082 A | 10/1963 | Reynolds |
| 3,224,122 A | 12/1965 | Jepson et al. |
| 3,313,490 A | 4/1967 | Loveland |
| 3,376,097 A | 4/1968 | Biber et al. |
| 3,448,923 A | 6/1969 | Saponara |
| 3,537,473 A | 11/1970 | DeZurik |
| 3,643,688 A | 2/1972 | Meinert |
| 3,949,966 A | 4/1976 | Fabish |
| 3,964,514 A | 6/1976 | Manoogian et al. |
| 4,020,870 A | 5/1977 | Carlson |
| 4,093,178 A | 6/1978 | Hughes et al. |
| 4,140,297 A | 2/1979 | Bussell |
| 4,355,659 A | 10/1982 | Kelchner |
| 4,366,947 A | 1/1983 | Voege |
| 4,499,630 A | 2/1985 | Harris |
| 4,614,490 A | 9/1986 | Kiczek et al. |
| 4,637,429 A | 1/1987 | Dietiker et al. |
| 4,740,154 A | 4/1988 | Cantoni |
| 4,804,324 A | 2/1989 | Yoshinaga |
| 4,862,917 A | 9/1989 | Genbauffe |
| 4,947,891 A | 8/1990 | Genbauffe |
| 5,009,393 A | 4/1991 | Massey |
| 5,014,528 A | 5/1991 | Roberts |
| 5,020,774 A | 6/1991 | Christianson |
| 5,082,023 A | 1/1992 | D'Alayer de Costemore d'Arc |
| 5,141,018 A | 8/1992 | Guterman |
| 5,238,398 A | 8/1993 | Harris |
| 5,259,589 A | 11/1993 | Posner |
| 5,345,838 A | 9/1994 | Howie |
| 5,413,141 A | 5/1995 | Dietiker |
| 5,435,343 A | 7/1995 | Buezis |
| 5,522,429 A | 6/1996 | Bechte |
| 5,899,439 A | 5/1999 | Gottwald |
| 5,931,387 A | 8/1999 | Hurley et al. |
| 5,937,847 A | 8/1999 | Garceau |
| 5,975,072 A | 11/1999 | Garceau |
| 5,983,884 A | 11/1999 | Lee |
| 5,992,457 A | 11/1999 | Humpert |
| 6,027,335 A | 2/2000 | Griffioen |
| 6,068,017 A | 5/2000 | Haworth et al. |
| 6,162,048 A | 12/2000 | Griffioen |
| 6,170,507 B1 | 1/2001 | Dalton et al. |
| 6,341,760 B1 | 1/2002 | Rawlings |
| 6,347,784 B1 | 2/2002 | Philipps-Liebich et al. |
| 6,357,721 B1 | 3/2002 | Maurer |
| RE37,617 E | 4/2002 | Sherman |
| 6,394,081 B1 | 5/2002 | Aguirre-Esponda et al. |
| 6,446,935 B1 | 9/2002 | Winkler |
| 6,520,481 B2 | 2/2003 | Harneit |
| 6,640,390 B1 | 11/2003 | Lai |
| 6,666,227 B2 | 12/2003 | Erickson |
| 6,758,242 B2 | 7/2004 | Jones |
| D498,657 S | 11/2004 | Milrud et al. |
| 6,871,803 B1 | 3/2005 | Ohmi et al. |
| 6,941,962 B2 | 9/2005 | Haddad |
| 7,036,188 B1 | 5/2006 | Howie |
| 7,096,887 B2 | 8/2006 | Tupa |
| 7,156,370 B2 | 1/2007 | Albizuri |
| 7,237,570 B2 | 7/2007 | Garnard |
| 7,458,386 B2 | 12/2008 | Zhang |
| 7,641,470 B2 | 1/2010 | Albizuri |
| 7,651,330 B2 | 1/2010 | Albizuri |
| 7,931,216 B2 | 4/2011 | Chung |
| 7,950,384 B2 | 5/2011 | Albizuri |
| 7,963,763 B2 | 6/2011 | Albizuri |
| 7,967,005 B2 | 6/2011 | Parrish |
| 8,092,212 B2 | 1/2012 | Albizuri |
| 8,281,780 B2 | 10/2012 | Carvalho et al. |
| 8,282,390 B2 | 10/2012 | Albizuri |
| 8,449,289 B2 | 5/2013 | Albizuri |
| 2003/0010952 A1 | 1/2003 | Morete |
| 2004/0089830 A1 | 5/2004 | Beyrak |
| 2004/0238029 A1 | 12/2004 | Haddad |
| 2005/0109967 A1 | 5/2005 | Ohmi et al. |
| 2005/0202361 A1 | 9/2005 | Albizuri |
| 2006/0060251 A1 | 3/2006 | Gamard et al. |
| 2006/0175566 A1 | 8/2006 | Albizuri |
| 2006/0197043 A1 | 9/2006 | Santinanavat et al. |
| 2006/0201496 A1 | 9/2006 | Shingler |
| 2008/0138749 A1 | 6/2008 | Albizuri |
| 2008/0156378 A1 | 7/2008 | Zhang |
| 2008/0202496 A1 | 8/2008 | Albizuri |
| 2008/0227045 A1 | 9/2008 | Deng |
| 2008/0289615 A1 | 11/2008 | Parrish |
| 2009/0047610 A1 | 2/2009 | Teng |
| 2010/0035196 A1 | 2/2010 | Deng |
| 2010/0089385 A1 | 4/2010 | Albizuri |

(56) References Cited

U.S. PATENT DOCUMENTS

| | | | |
|---|---|---|---|
| 2010/0089386 | A1 | 4/2010 | Albizuri |
| 2010/0154777 | A1 | 6/2010 | Carvalho et al. |
| 2010/0330513 | A1 | 12/2010 | Deng |
| 2010/0330518 | A1 | 12/2010 | Deng |
| 2011/0005508 | A1 | 1/2011 | Albizuri |
| 2011/0030501 | A1 | 2/2011 | May |
| 2011/0143294 | A1 | 6/2011 | Deng |
| 2012/0006091 | A1 | 1/2012 | Deng |
| 2012/0031391 | A1 | 2/2012 | Albizuri |
| 2012/0073560 | A1 | 3/2012 | Parrish |
| 2012/0073562 | A1 | 3/2012 | Albizuri |
| 2013/0213384 | A1 | 8/2013 | Albizuri |

FOREIGN PATENT DOCUMENTS

| | | |
|---|---|---|
| DE | 3039378 A1 | 5/1982 |
| EP | 0805310 | 11/1997 |
| ES | 1069849 | 5/2009 |
| FR | 1517003 | 2/1968 |
| FR | 2642148 | 7/1990 |
| GB | 1165762 A | 10/1969 |
| GB | 1298809 | 12/1972 |
| GB | 1329893 | 9/1973 |
| GB | 1444673 | 8/1976 |
| JP | 62188867 | 8/1987 |
| JP | 02286971 A | 11/1990 |
| WO | WO/2006/084690 A2 | 8/2006 |

OTHER PUBLICATIONS

International Search Report Application No. PCT/EP2006/001143 issued by European Patent Office, Rijswijk, Netherlands, dated Aug. 1, 2006.

Defendant's Initial Disclosures; *Coprecitec, S.L., et al. v. The Brinkmann Corporation*, United States District Court, Northern District of Georgia, Atlanta Division, civil action file No. 1:12-CV-1480-AT, all pp. 1-16 thereof, together with Attachments A and C, all pages thereof and the Certificate of Service, one page, all pages of the document attached hereto, filing dated Aug. 13, 2012, filed by Angela M. Spivey of McGuire Woods LLP, Atlanta, Georgia.

Defendant's Invalidity Contentions; *Coprecitec, S.L., et al. v. The Brinkmann Corporation*, United States District Court, Northern District of Georgia, Atlanta Division, civil action file No. 1:12-CV-1480-AT, all pp. 1-6 thereof, together with Attachment, Exhibit A, all pp. 1-23 thereof and the Certificate of Service, two pages; all pages of the document attached hereto, filing dated Oct. 19, 2012, filed by Angela M. Spivey of McGuire Woods LLP, Atlanta, Georgia.

Defendant's Response to Plaintiff's Infringement Contentions; *Coprecitec, S.L., et al. v. The Brinkmann Corporation*, United States District Court, Northern District of Georgia, Atlanta Division, civil action file No. 1:12-CV-1480-AT, all pp. 1-4 thereof, together with Attachment, Exhibit A, all pp. 1-18 thereof and the Certificate of Service, two pages; all pages of the document attached hereto, filing dated Oct. 19, 2012, filed by Angela M. Spivey of McGuire Woods LLP, Atlanta, Georgia.

In the United States Patent and Trademark Office Before the Patent Trial and Appeal Board, *The Brinkmann Corporation*, Petitioner, v. *Coprecitec, S.L.*, Patent Owner, U.S. Pat. No. 8,449,289, Issued May 28, 2013, title Multi-Gas Appliance; Inter Partes Review No. IPR2013-00435, Corrected Petition for Inter Partes Review of US Pat. No. 8,449,289; the corrected petition dated Jul. 22, 2013.

In the United States Patent and Trademark Office Before the Patent Trial and Appeal Board, *The Brinkmann Corporation*, Petitioner, v. *Coprecitec, S.L.*, Patent Owner, U.S. Pat. No. 8,449,289, Issued May 28, 2013, title Multi-Gas Appliance; Inter Partes Review No. IPR2013-00435, The Brinkmann Corporation's Amended Exhibit List (for Inter Partes review of U.S. Pat. No. 8,449,289; the corrected petition dated Jul. 22, 2013.

In the United States Patent and Trademark Office Before the Patent Trial and Appeal Board, *The Brinkmann Corporation*, Petitioner, v. *Coprecitec, S.L.*, Patent Owner, Case IPR2013-00435, U.S. Pat. No. 8,449,289; Notice of Filing Date Accorded to Petition and Time for Filing Patent Owner Preliminary Response mailed Jul. 17, 2013.

In the United States Patent and Trademark Office Before the Patent Trial and Appeal Board, *The Brinkmann Corporation*, Petitioner, v. *Coprecitec, S.L.*, Patent Owner, U.S. Pat. No. 8,449,289, Issued May 28, 2013, title Multi-Gas Appliance; Inter Partes Review No. IPR2013-00435, Petition for Inter Partes Review of U.S. Pat. No. 8,449,289, and Exhibit list; the petition dated Jul. 10, 2013.

In the United States Patent and Trademark Office Before the Patent Trial and Appeal Board, *The Brinkmann Corporation*, Petitioner, v. *Coprecitec, S.L.*, Patent Owner, U.S. Pat. No. 8449289, Issued May 28, 2013, title Multi-Gas Appliance; Inter Partes Review No. IPR2013-00435; Exhibit TBC 1001, 1002, and 1003 dated Jul. 10, 2013.

In the United States Patent and Trademark Office Before the Patent Trial and Appeal Board, *The Brinkmann Corporation*, Petitioner, v. *Coprecitec, S.L.*, Patent Owner, U.S. Pat. No. 8449289, Issued May 28, 2013, title Multi-Gas Appliance; Inter Partes Review No. IPR2013-00435; Exhibit TBC 1004, Declaration of Randall L. May (Inter Partes review of U.S. Pat. No. 8,449,289) dated Jul. 10, 2013.

In the United States Patent and Trademark Office Before the Patent Trial and Appeal Board, *The Brinkmann Corporation*, Petitioner, v. *Coprecitec, S.L.*, Patent Owner, U.S. Pat. No. 8449289, Issued May 28, 2013, title Multi-Gas Appliance; Inter Partes Review No. IPR2013-00435; Exhibit TBC 1005, File History of U.S. Pat. No. 8,449,289.

In the United States Patent and Trademark Office Before the Patent Trial and Appeal Board, *The Brinkmann Corporation*, Petitioner, v. *Coprecitec, S.L.*, Patent Owner, U.S. Pat. No. 8449289, Issued May 28, 2013, title Multi-Gas Appliance; Inter Partes Review No. IPR2013-00435; Exhibit TBC 1006, File History of U.S. Pat. No. 8,449,289 (with pagination).

In the United States Patent and Trademark Office Before the Patent Trial and Appeal Board, *The Brinkmann Corporation*, Petitioner, v. *Coprecitec, S.L.*, Patent Owner, U.S. Pat. No. 8,449,289, Issued May 28, 2013, title Multi-Gas Appliance; Inter Partes Review No. IPR2013-00435; Patent Owner's Mandatory Notices Pursuant to 37 C.F.R. § 42.8 dated Jul. 31, 2013.

Protest Under 37 CFR § 1.291 in U.S. Appl. No. 13/859,576, (Reissue application of U.S. Pat. No. 7,963,763; re-issue application filed Apr. 9, 2013) Protest filed Jul. 25, 2013, in the Untied States Patent and Trademark Office, filed by The Brinkmann Corporation with Exhibit A, GB Patent No. 1,165,762 published Oct. 1, 1969.

Protest Under 37 CFR § 1.291 in U.S. Appl. No. 13/859,576, (Reissue application of U.S. Pat. No. 7,963,763; re-issue application filed Apr. 9, 2013) Protest filed Jul. 25, 2013, In the Untied States Patent and Trademark Office, filed by The Brinkmann Corporation, Exhibit B, GB Patent No. 1,444,673 published Aug. 4, 1976.

Protest Under 37 CFR § 1.291 in U.S. Appl. No. 13/859,576, (Reissue application of U.S. Pat. No. 7,963,763; re-issue application filed Apr. 9, 2013) Protest filed Jul. 25, 2013, In the Untied States Patent and Trademark Office, filed by The Brinkmann Corporation, Exhibit C, U.S. Pat. No. 5,983,884 issued Nov. 16, 1999.

Protest Under 37 CFR § 1.291 in U.S. Appl. No. 13/859,576, (Reissue application of U.S. Pat. No. 7,963,763; re-issue application filed Apr. 9, 2013) Protest filed Jul. 25, 2013, In the Untied States Patent and Trademark Office, filed by The Brinkmann Corporation, Exhibit D, Randall L. May Declaration dated Jul. 25, 2013.

Protest Under 37 CFR § 1.291 in U.S. Appl. No. 13/859,576, (Reissue application of U.S. Pat. No. 7,963,763; re-issue application filed Apr. 9, 2013) Protest filed Jul. 25, 2013, In the Untied States Patent and Trademark Office, filed by The Brinkmann Corporation, Exhibit E, U.S. Pat. No. 7,963,763 issued Jun. 21, 2011 and Exhibit F, PTO/SB/08a Information Disclosure Statement by Applicant.

MULTI-GAS APPLIANCE

TECHNICAL FIELD

The present invention relates to a gas tap of the tapered rotary appendix type attached to a rotary actuating shaft, being the gas tap mounted on the panel of a cooking appliance, wherein the rotary appendix is provided with a series of openings for adjusting the flow rate according to the fuel gas family supplied to the cooking appliance.

PRIOR ART

Gas taps of the above-defined type, provided with a dome-shaped bearing bush guiding the rotation of the actuating shaft and fulfilling at the same time the function of a cover for the hollow tap body, are already known. The gas tap is mounted on the front control panel with the actuating shaft passing through an external control panel in the appliance, and the tap body resting inside the appliance connected to a fuel gas supply tube or nipple. The external free end of the actuating shaft is fitted with a rotary control knob inserted in the latter. The control knob is removable from the shaft by pulling it out. The hollow body of the tap has its own gas outlet conduit which is connected to the respective appliance burner.

An example of rotary tap of the above type is disclosed in EP-0805310-A1, having its actuating shaft coupled to a frustro-conical regulating organ, which is able to rotate a given angle for the supply of a gas flow from two angular positions spaced around 120.degree. apart, corresponding respectively to a high or maximum flow "Qmax" and to a low or minimum flow "Qmin", the latter applied to "gentle boiling". The rotation of the shaft as far as one of the angular positions, is started from an initial valve closed "OFF" position.

In this type of known valves the actuating shaft has a pin protruding in a radial direction to limit its angular travel, guided on a circular surface in the inner face of the body cover or some other part of the valve body. The total travel of the regulating organ thus limited is, for instance, 210.degree. from the OFF position. The end position corresponds to Qmin. Any of the flows Qmax, Qint—intermediate flow—and Qmin is regulated by way of a corresponding hole or groove in the regulating organ facing the outlet conduit. All the flow rates are supplied from a common inlet conduit through an inner chamber in the regulating organ which is in communication with an outlet conduit. The Qmin outlet hole has an area of calibrated section for a standard type of given fuel gas, adjusted according to the output power of the cooking appliance burner.

Solutions are already known for a single tap to be mounted on cooking appliances that use two different types of gas, such as natural gas (NG) or liquefied petroleum gas (LPG). For example, in U.S. Pat. No. 5,009,393 an additional valve element in the form of a sleeve, is inserted in the inner chamber of the tapered regulating organ. The area of the opening section for the passage of gas flow towards the outlet, which corresponds to low flow or minimum flow Qmin, is adjusted by rotating this added valve sleeve which thus modifies the uncovered section area of the outlet opening.

This known solution has the disadvantage that for adjusting the Qmin for the rotation of the valve sleeve, it is necessary to use a screwdriver, which has to be inserted from an opening in the actuating shaft until it reaches the valve sleeve and to transmit a precise turn.

DISCLOSURE OF THE INVENTION

The object of the invention comprises a gas tap for a domestic cooking appliance of the type with a frustro-conical regulating organ coupled to an actuating shaft and to a rotary control knob, which is capable of supplying different required flows of gas lying between two angular limit positions, of either of the two different types of gas, N gas or LP gas, the tap having a dual means for limiting the angle of rotation of the regulating organ, and the control knob being interchangeable on the actuating shaft, which depending on the type of gas used by the appliance can or can not be provided, with a means for guiding the rotation in cooperation with a means for limiting the rotation provided on a panel on the cooking appliance.

The gas valve according to the invention is capable of providing two angular positions of the regulating organ, both spaced apart from each other to supply a different minimum flow Qmin according to the type of gas, NG or standard LPG, used as the fuel for the appliance. For this purpose the regulating organ has two successive Qmin outlet holes spaced apart in the angular direction, which face up individually with the inlet hole in the tap body, being the two different angular positions established by means of a respective rotation stop.

The use of a single valve for regulating the flow of two different gas families is an advantage of the gas valve invention, when mounted on a cooking appliance. During the start-up of the cooking appliance the user only has to carry out a choice for a control knob from among two available units accompanying the valve, in accordance with the type of fuel gas NG or LP appropriate for the cooking appliance. Instead of mounting to each rotary valve shaft one elected class of control knob, the user also can choose for an element of cooker panel, from among two different available units of a panel element to be mounted on the cooker. In this way, it is not necessary to use tools for adjusting the flow, nor to learn how to adjust the regulating organ as is required in the prior art valve.

DETAILED DESCRIPTION OF PREFERRED EMBODIMENTS

Figure 7:
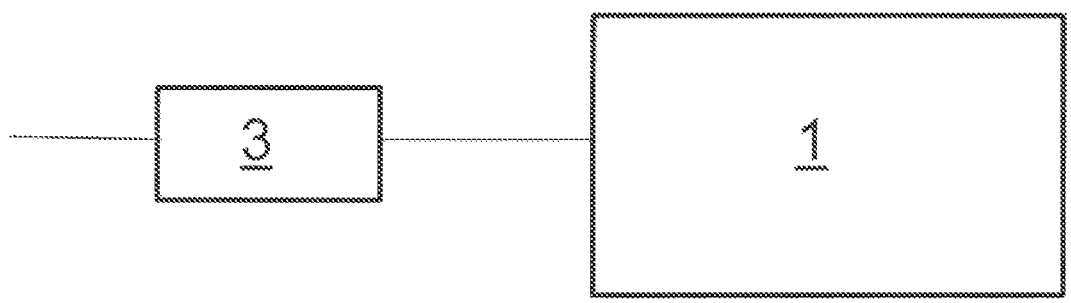
FIG. 7 is a schematic diagram of a valve connected to a multi-gas burning appliance.

With reference to FIGS. 1-4 and 7, a first embodiment of a gas cooking appliance 1A such as a barbecue has an external control panel 2 on which are mounted one or more rotary gas valves of an existing general type. The cooking appliance 1A, as schematically shown in FIG. 7, may be of two types in respect of the type of gas supplied, natural gas (NG) or liquefied gas (LPG) from the external source—GAS IN—through a valve inlet conduit 4 in the valve body 3a. Each one of the valves 3 mounted on the panel 2 is always of a single type, all with a same valve body 3a and a same frustro-conical regulating organ 6. The inlet flow "Q" is transmitted to an internal chamber 8 in regulating organ 6 in communication with an outlet conduit 5 in the valve body 3a. The regulating organ 6 rotates around a central axis 10 actuated by shaft 7 for the supply of the flow "Q", which is directed towards a burner on the appliance (not shown in the drawings), being the latter specifically adapted to either N gas or LP gas.

The valve body 3a has an elongated shape with a similarly frustro-conical central housing cavity 15, wherein the regulating organ 6 is pushed by a spring 11 for a tight sealing. The free end of the actuating shaft 7 is installed passing through a hole 2a in the appliance panel 2, and afterwards the user fits it with a control knob 9, which is chosen from the two different units of control knob 9, both supplied to the user with each valve unit 3. A cover 12 protecting the housing cavity 15, has a tubular portion 12b for guiding the actuating shaft 7 in rotation.

The regulating organ 6 may rotate with the shaft 7 an angle "A" in either of the two directions from an initial angular "OFF" position corresponding to the valve closed condition, to an angle A larger than 180.degree. and smaller than 360.degree. The OFF position is the initial end of the rotational travel "A", and it is established by a radial pin 13 on the shaft. The cover 12 presents a sliding surface for the radial pin 13, extending in a rotating arc "A3" ending in a recess 12a in the cover, which acts as a stop for the rotation of the radial pin 13.

Figure 2A:
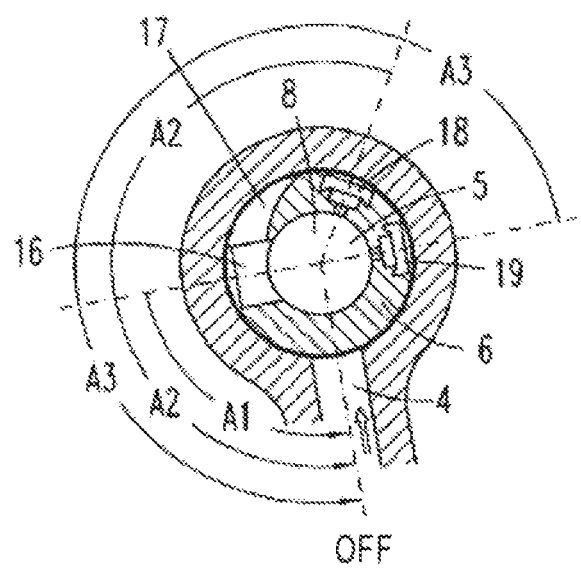
FIG. 2a is a sectional view of the valve regulating organ according to the line II-II of FIG. 1 with no fluid flow passage being established through the regulating organ.
Figure 2B:
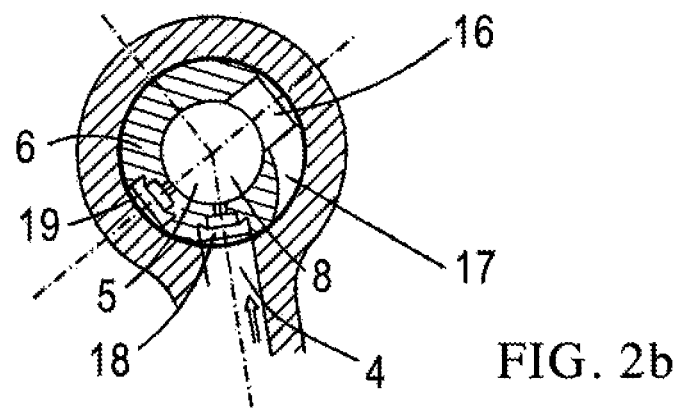
FIG. 2b is a sectional view of the valve regulating organ according to the line II-II of FIG. 1 with a first fluid flow passage established through the regulating organ.
Figure 2C:
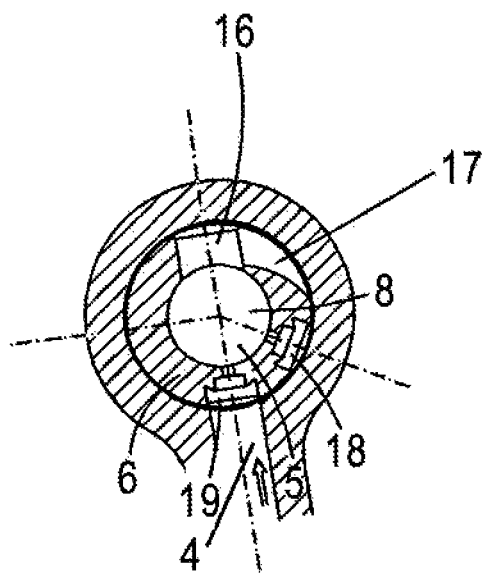
FIG. 2c is a sectional view of the valve regulating organ according to the line II-II of FIG. 1 with a second fluid flow passage established through the regulating organ.
Figure 3:
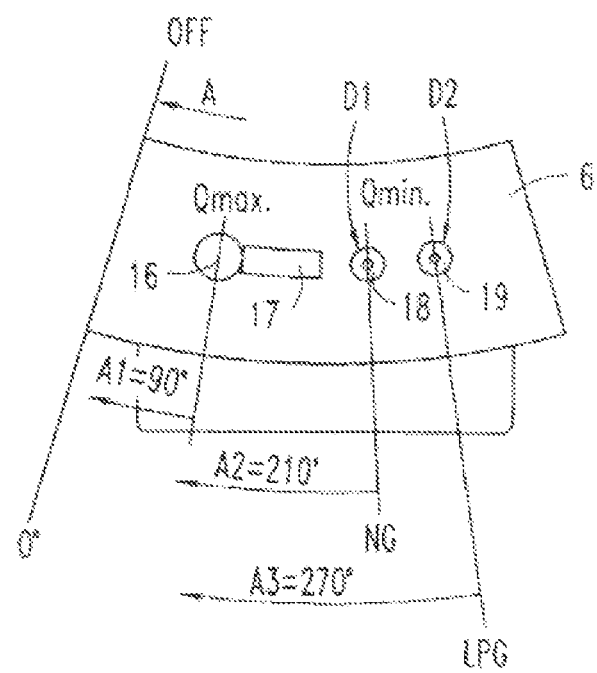
FIG. 3 is a development view of the valve regulating organ of FIG. 2.
Figure 4:
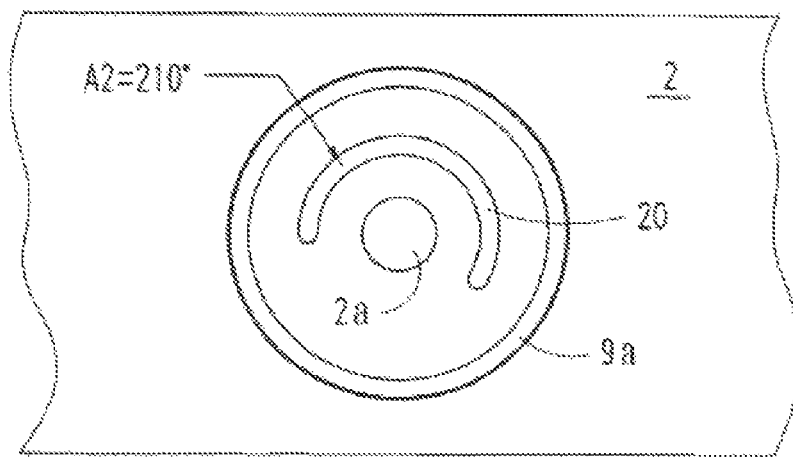
FIG. 4 is a front view of the valve installation panel according to FIG. 1.

FIGS. 2 and 3 show an example of the rotary valve 3 used in both embodiments 1A and 1B of cooking appliances described here. From the angular position OFF rotating in a clockwise direction, the frustro-conical organ 6 may regulate the supply of different gas flows, a maximum flow "Qmax", a minimum "Qmin" and an intermediate flow "Qint" between the Qmax and the Qmin, in function of the angle rotated "A". A constant minimum flow "Qmin" of the N gas must be higher than a "Qmin" of the LP gas, when supplied to a respective burner in both cases of the same power.

Figure 1:
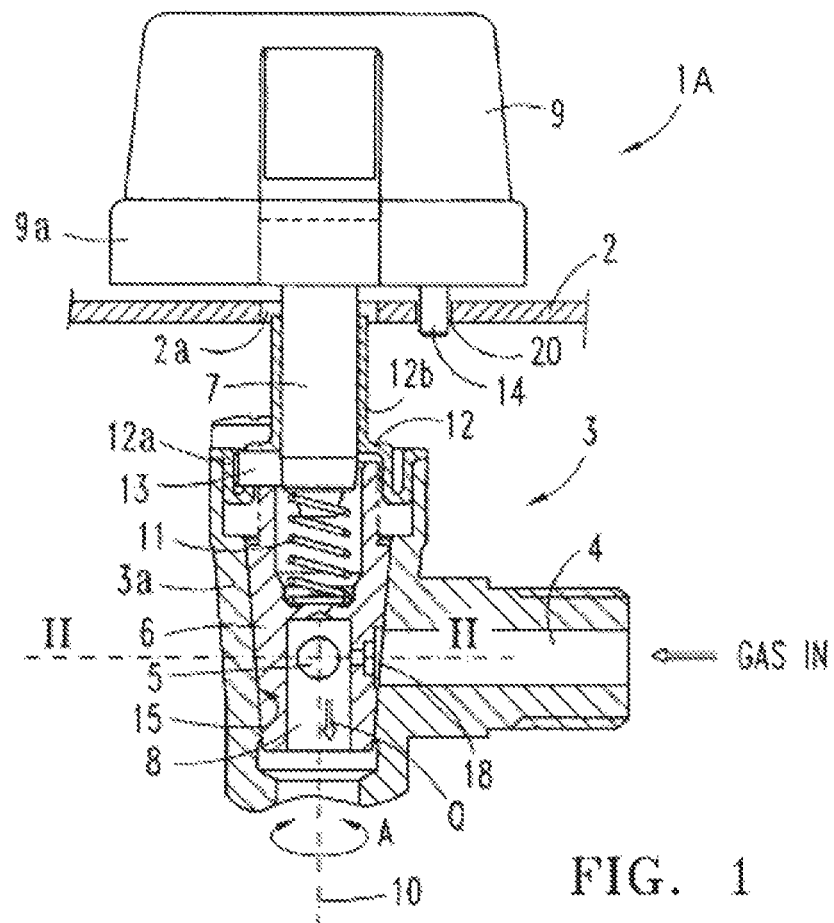
FIG. 1 is a sectional view of a gas valve fitted on a panel of a cooking appliance according to a first embodiment.

Depending on whether N or LP gas is supplied to the cooking appliance, the control knob 9 to be fitted on the actuating shaft 7 is distinguished by means of an appendix 14 integral with the control knob. A first class of control knob 9 to be chosen for incorporating to each valve rotary shaft before being mounted on the appliance 1A, represented on FIG. 1, is adapted for the supply of N gas, being provided therefore with a protuberance or appendix 14 projecting from a knob base 9a facing the panel 2. A second class of control knob 9 lacks in having the protuberance 14 (not shown in the drawings), then the choice for supplying the gas LPB is chosen in order to be mounted on a cooking appliance 1A for supplying gas LPG. In this case, the control knob 9 can be rotated up to an angle "A3" greater than the limit position A2 for the knob unit 9 provided with the protuberance 14. The angular limit A3 to the position of the regulating organ 6 depicted in FIG. 3, is imposed by said radial pin 13 stopping against said recess 12a in the valve cover 12.

In reference to FIGS. 2 and 3, the regulating organ 6 rotates to an angular position A1=90 degrees, for the supply of a maximum flow "Qmax" of either NG or LPG on both types of cooking appliance 1. In this angular position A1, the Qmax inflow is regulated by a through hole 16 in the regulating organ, facing the inlet conduit 4. If the regulating organ 6 is rotated further, an intermediate flow "Qint" will be supplied by way of an ensuing flow opening 17 in the form of a groove which has a decreasing area. Being substantially lower than the Qmax, the "Qint" flow is diminishing in accordance with the angle A rotated, until a through hole 18 for a "Qmin" flow is facing the inlet conduit 4 at an correspondent angular position A2=210 degrees. The diameter D1 of this hole 18 is calibrated for the supply of a Qmin of NG.

On the NG type cooking appliance, the knob class provided with the appendix 14 cannot turn through an angle larger than A2. The external control panel 2 (FIG. 4) has a circular groove 20 travelled by said appendix 14 of the knob 9. Its angular extension A2=210 degrees imposes the limit of angular travel governing the regulating organ 6, from the OFF position to the outlet of the NG Qmin flow by way of hole 18.

Once installed on the panel 2, the knob unit 9 chosen for the supply of LPG, lacks in having said appendix 14 or any other element limiting the angle "A" of rotation. Thus, the regulating organ 6 may rotate as far as an angular position A3=270 degrees, located farther away from the initial OFF position than the prior position "A2", until a second through hole 19 lines up with the inlet conduit 4. The diameter D2 of hole 19 is calibrated for the supply of a predetermined LPG "Qmin" flow.

It is preferred that the control knob 9 button impose a rotational end position A2 less than the end position A3 imposed by the actuating shaft 7, 13, because the valve body is constructed according to the existing model with a limit A3=270.degree. of rotation of the shaft 7, radial pin 13 already imposed. The angular values are indicated herein as an example. Similarly, the regulating valve 3 and its rotary regulating organ 6 may be constructed with through holes 16-19, superimposed for the regulation of the flow "Q" to the outlet conduit 5 of the valve instead of the inlet conduit 4 as shown in FIG. 2.

The cover 12 of the valve body is equipped with a tubular part 12b for guiding the actuating shaft of the valve 7 and the recess 12a to limit the angular stroke A3=270 degrees corresponding to the Qmin of LPG. The cover 12 can be made at a low cost using die-stamping operations. The mould for the two different classes of control knob 9, provided with and lacking the guide means 14 can also be made inexpensively by plastic molding.

The placement of the two stop means 12a and 20, respectively in the valve body 3a and in the control or assembly panel 2 of the appliance 1A, each one of them with a predetermined circular extension, corresponds with the two angular travels A3 and A2. The angular space A-A2 existing between them corresponds to the intermediate space between the two orifices of passage 18 and 19, which are calibrated for a constant Qmin of NG and LPG, respectively. Hence, the same valve unit 3 is valid for either of the two types of gas supplied to the cooking appliance 1A, without the need for any adjustment or change in the regulating organ 6 for the supply of another type of gas.

Figure 5:
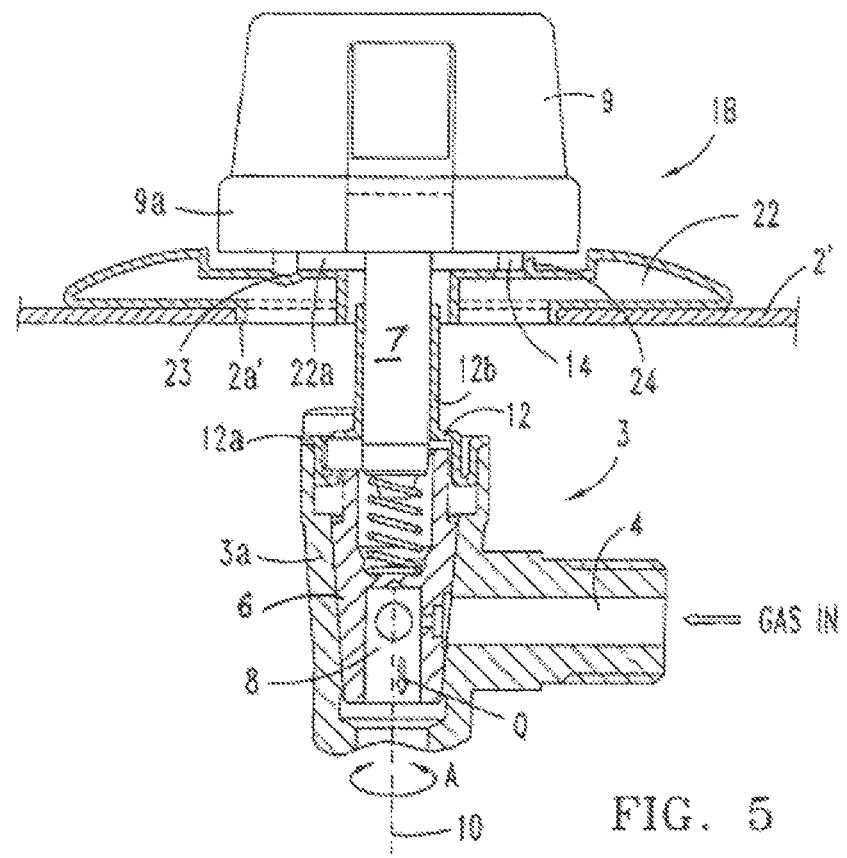
FIG. 5 is a sectional view of a gas valve fitted on a panel of a cooking appliance according to a second embodiment.
Figure 6:
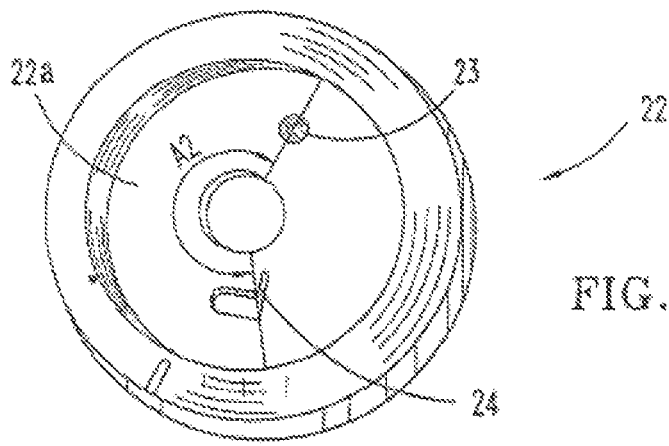
FIG. 6 is a perspective view of an element of the panel of cooking appliance in FIG. 5.

With reference to FIG. 5 and FIG. 6, a second preferred embodiment of the cooking appliance 1B is described below, with one or more rotary valves 3 mounted on an external panel 2' of the appliance. The rotary valves 3 comprising an actuating shaft 7 with a radial pin 13, a regulator organ 6 such as the one represented in FIG. 2 and FIG. 3, and a control knob 9 having a base 9a and a guide means or appendix 14, are common to the first embodiment 1A represented in FIG. 1 described above. In this second embodiment 1B of the cooking appliance, the external assembly panel 2' is adapted as a control panel that includes a bezel disk 22 for encircling the control knob 9, which is fixed to an opening 2a' on the visible face of the external or control panel. The bezel disk 22 is of the type used in the prior art, for the purpose of embellishing having an indicator dial of said angular positions, OFF, A1, A2, A3 of the regulating organ 6, and forms part of the panel 2'. The bezel disk 22 is crossed through by one end of the actuating shaft 7 of the respective valve, having a central recess 22a housing the base 9a of the knob.

The bezel disk 22 is provided with a stop means 24 for the rotation of the control knob 9. The stop means 24 protrudes toward the guide means 14 at the base 9a of the knob, and is constructed preferably of a tongue 24 lifted from a cut-off in the surface of the recess 22a, as shown in FIG. 6. The rotation guide means 14 hits against the tongue 24 when it has rotated to the limit position "A2" (FIG. 3) of the regulator organ 6 corresponding to a Qmin flow supply of natural gas NG. In the "off" position of the valve, the appendix 14 rests on a boss 23 in the central recess 22a, thus the space apart from the boss 23 up to the tongue 24 is the angular travel A2. A second type of bezel disk 22 lacks in having the tongue 24 for the travel stop "A2" (not represented in the drawings). It is also provided to the user of the cooking appliance 1B, to be chosen for the supply of a flow "Qmin" of LPG gas, by which the rotation limit "A" is imposed only by the radial pin 13 of the shaft 7, until the second limit position "A3" of the regulating organ 6, through the calibrated orifice 19 in the regulator organ 6 (FIG. 2). According to the second embodiment 1B, the user assembles, for either the supply of NG or LPG, the same type of control knob 9 equipped with an appendix 14, but a bezel disk 22 provided with or lacking the rotation stop tongue 24 respectively.

Other embodiments of the invention in addition to those 1A and 1B described above are also possible. Either a half of the control knob 9 units those of the class provided with a rotation guide means 14, or a half of the panel element units 22 those of equipped with a stop means 24, will be chosen to be assembled in an appliance 1A or 1B of the type for supplying the gas NG, said guide means 14 interacting with a stop means 20 or 22 on the fixed part of the cooking appliance. On the other hand, the appliance to be supplied either with the gas LPG will be equipped either with a knob unit 9 of the half lacking the rotation guide means 14, or with a panel element unit 22 of the half lacking the stop means 24.

Likewise, another rotation guide means of the shaft 7 different than the radial pin 13 described here can be constructed for the supply position A3 of Qmin of LPG through the calibrated orifice 19, interacting with a travel stop in the body 3a also different from the recess 12a in the cover 12 herein described. The cooking appliance 1A,1B is always equipped with identical rotary valves 3 for either the supply of NG or LPG, only chosen the class of control knob 9 provided with or lacking the rotation guide means 14, or chosen the panel element unit 22 provided with or lacking the rotation stop means 24.

What is claimed is:

1. A gas burning apparatus having a burner and being adapted for a selectively supplying one of a natural gas at a first pressure and a liquefied petroleum gas at a second pressure to the burner, the gas burning apparatus comprising a fluid flow controller having an internal organ disposed within a housing, the internal organ coupled with and manipulated by a rotating actuating shaft that extends from a housing of the fluid flow controller, the fluid flow controller capable of assuming at least a first flow configuration and a second flow configuration, the first flow configuration being established when the actuating shaft is in a first angular position to cause the internal organ to assume a first position within the housing of the fluid flow controller, the second flow configuration being established when the actuating shaft is in a second angular position to cause the internal organ to assume a second position within the housing of the fluid flow controller, the second angular position different from the first angular position, the second angular position being successive to the first angular position, the fluid flow controller having a stop that prevents rotation of the actuating shaft beyond the second angular position, upon assuming the first flow configuration a first fluid flow path is established through the internal organ of the fluid flow controller that is specifically configured for the delivery of the natural gas to the burner and upon assuming the second flow configuration a second fluid flow path is established through the internal organ of the fluid flow controller that is specifically configured for the delivery of the liquefied petroleum gas to the burner.

2. A gas burning device according to claim 1, wherein the first fluid flow path comprises a first through hole passage having a first diameter and the second fluid flow path comprises a second through hole passage having a second diameter, the second diameter being smaller than the first diameter.

3. A gas burning apparatus having a burner and being adapted for selectively supplying one of a natural gas at a first pressure and a liquefied petroleum gas at a second pressure to the burner, the gas burning apparatus comprising a fluid flow controller having a housing with a rotatable organ disposed therein, the rotatable organ coupled and rotatable with an actuating shaft that extends from the housing, the fluid flow controller capable of assuming at least a first flow configuration and a second flow configuration, the first flow configuration being established when the rotatable organ is in a first angular position, the second flow configuration being established when the rotatable organ is in a second angular position that is different from the first angular position, the second angular position being successive to the first angular position, the fluid flow controller having a stop that prevents rotation of the rotatable organ beyond the second angular position, upon assuming the first flow configuration a first fluid flow path is established through the rotatable organ of the fluid flow controller that is specifically configured for the delivery of the natural gas to the burner and upon assuming the second flow configuration a second fluid flow path is established through the rotatable organ of the fluid flow controller that is specifically configured for the delivery of the liquefied petroleum gas to the burner.

4. A gas burning device according to claim 3, wherein the first fluid flow path comprises a first through hole passage having a first diameter and the second fluid flow path comprises a second through hole passage having a second diameter, the second diameter being smaller than the first diameter.

* * * * *